United States Patent [19]
Alfors et al.

[11] Patent Number: 5,627,465
[45] Date of Patent: May 6, 1997

[54] ROTATIONAL POSITION SENSOR WITH MECHANICAL ADJUSTMENT OF OFFSET AND GAIN SIGNALS

[75] Inventors: Eugene D. Alfors, Rockford; Ronald G. Cox, Cedarville, both of Ill.

[73] Assignee: Honeywell Inc., Minneapolis, Minn.

[21] Appl. No.: 548,108

[22] Filed: Oct. 25, 1995

[51] Int. Cl.⁶ .................................................. G01B 7/30
[52] U.S. Cl. ................... 324/207.2; 324/207.12; 324/207.25; 324/202
[58] Field of Search .................... 324/173, 174, 324/207.12, 207.2, 207.21, 207.22, 207.25, 202; 123/414, 617; 310/156; 73/518–520

[56] References Cited

U.S. PATENT DOCUMENTS

| | | | |
|---|---|---|---|
| 3,483,410 | 12/1969 | Siegelman et al. | 310/114 |
| 3,530,317 | 9/1970 | Lang | 324/207.2 X |
| 3,713,015 | 1/1973 | Frister | 310/156 X |
| 4,570,118 | 2/1986 | Tomczak et al. | 324/207.2 |
| 4,984,474 | 1/1991 | Matsushima et al. | 324/207.22 X |
| 5,164,668 | 11/1992 | Alfors | 324/207.2 |

*Primary Examiner*—Gerard R. Strecker
*Attorney, Agent, or Firm*—William D. Lanyi

[57] ABSTRACT

An angular position sensor is provided with a rotatable magnetic structure that comprises a primary magnet and a secondary magnet. The primary and secondary magnets are adjusted in position relative to each other in order to achieve an adjustability of the gain and offset characteristic of an output signal from a magnetically sensitive component disposed within the magnetic field of the magnetic structure. The primary and secondary magnets are rigidly maintained in position relative to each other and disposed for rotation about an axis of rotation. Each magnet has a magnetic axis extending though its first and second magnetic poles. The two magnetic axes rotate within parallel planes that are each perpendicular to the axis of rotation of the magnetic structure. The gain characteristic of the output signal from the magnetically sensitive component can be advantageously affected by changing the linear distance between the first and second planes in which the first and second magnetic axes of the primary and secondary magnets rotate. The offset characteristic of the output signal from the magnetically sensitive component can be advantageously affected by changing the angular dimension between the first and second magnetic axes of the primary and secondary magnets.

18 Claims, 6 Drawing Sheets

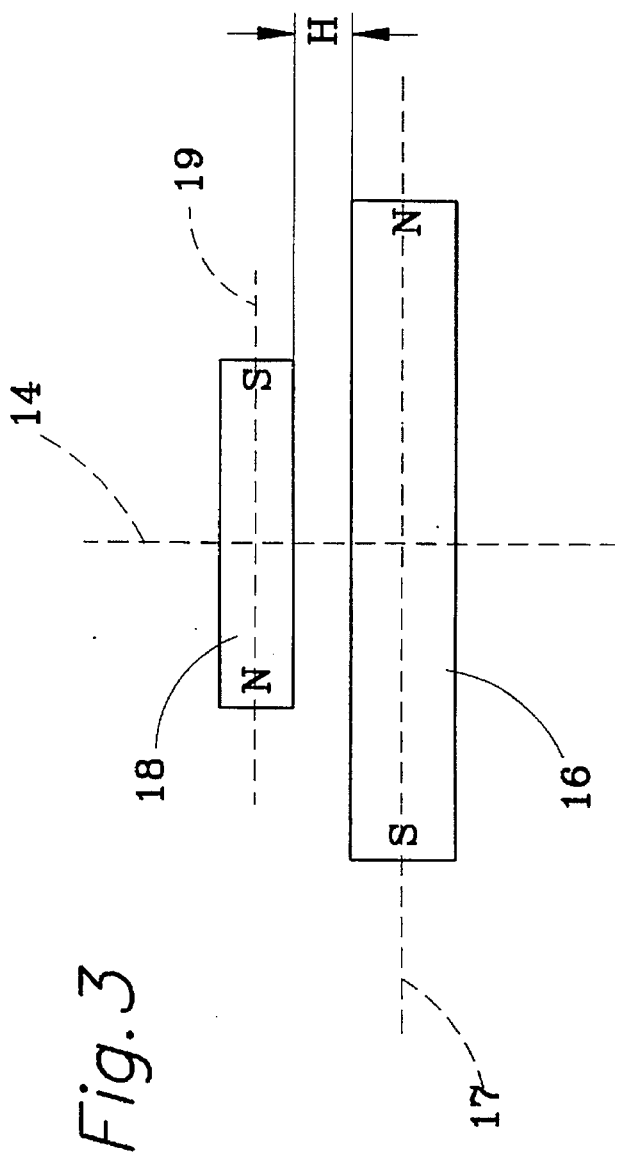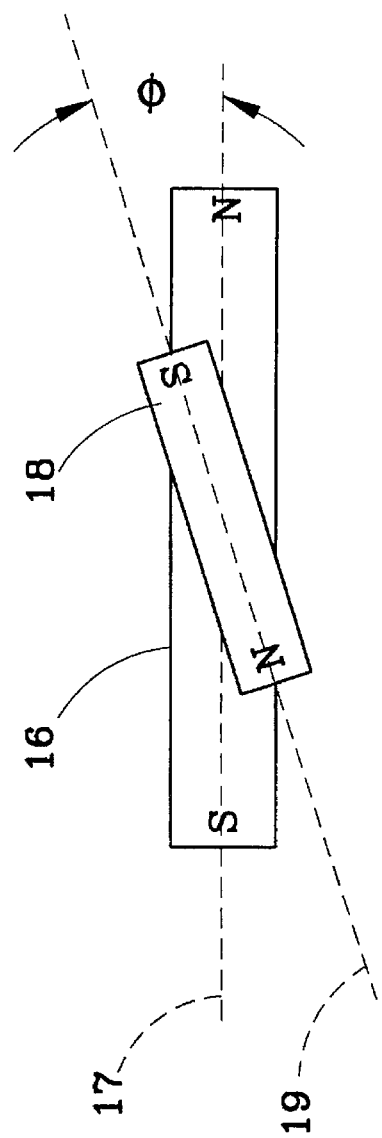
Fig. 3
Fig. 5

ROTATIONAL POSITION SENSOR WITH MECHANICAL ADJUSTMENT OF OFFSET AND GAIN SIGNALS

BACKGROUND OF THE INVENTION

1. Field of the Invention

The present invention relates generally to a rotational position sensor and, more particularly, to a rotational position sensor that permits the offset and gain of its output signals, provided by a magnetically sensitive component, to be mechanically adjusted and calibrated without the necessity of electronic calibration.

2. Description of the Prior Art

Many different types of rotational position sensors are known to those skilled in the art. In many applications where the rotational position of a rotatable member is monitored through the use of a magnetically sensitive component, one of two basic methods is employed. First, a magnetically sensitive component can be configured with a permanent magnet that provides a bias magnetic field. The bias field provided by the permanent magnet is imposed on the magnetically sensitive component and, when a ferromagnetic object attached to a rotatable shaft passes through a predetermined detection zone, the magnetic field is distorted and the component of the field imposed on the magnetically sensitive component changes. An output signal is provided to indicate this change which is representative of the movement of the rotatable member.

A second method for determining the angular position of a rotatable member is to rigidly attach a magnet to the rotatable member and then measure the effect that the rotating magnet has on a stationary magnetically sensitive component, such as a Hall effect element or a magnetoresistive element. As the magnetic field rotates with the permanent magnet and with the rotatable member, the effective component of the magnetic field imposed on the stationary component changes and can be used to represent the angular position of the rotatable member.

Many different types of angular position sensors can be configured according to the two basic concepts described above. The sensor can employ one or more magnetically sensitive components and the components can either be Hall effect elements or magnetoresistive elements. In addition, many types of pole piece structures have been developed to direct the magnetic field in desirable paths.

One particularly effective angular position sensor is described in U.S. Pat. No. 5,164,668 which issued to Alfors on Nov. 17, 1992. The rotational position sensor described in U.S. Pat. No. 5,164,668 is provided with a decreased sensitivity to the position of the shaft on which a permanent magnet is attached. The angular position sensor is provided with first and second pole pieces that extend from regions that are proximate a rotatable magnet to regions that are proximate a magnetically sensitive device. The pole pieces provide defined magnetic paths of lower reluctance that confine the lines of flux extending between the rotatable magnet and the magnetically sensitive device. The placement of the rotatable magnet between first and third pole piece segments of the invention significantly reduces the sensitivity of the sensor to variations in position of the rotatable magnet and therefore increases the reliability of the measuring system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive bearing wear.

In most angular position sensors known to those skilled in the art, an electronic calibration step is required if the angular position sensor is expected to achieve high accuracy in its measurement of the angular movement of a rotatable member. However, an electronic calibration step following the assembly of a rotational position sensor increases its costs and inhibits certain other manufacturing processes because of the fact that the electronic circuitry must remain exposed to permit calibration operations to be performed. Typically, these calibration processes comprise the trimming of resistors which are provided in conjunction with a circuit connected to the magnetically sensitive component. It would therefore be significantly beneficial if a means could be provided to allow the angular position sensor to be adjusted and calibrated mechanically without the need for electronic calibration.

SUMMARY OF THE INVENTION

An angular position sensor made in accordance with the present invention comprises a primary magnet which has first and second magnetic poles aligned along a first magnetic axis. The first magnetic axis is rotatable within a first plane. A secondary magnet is rigidly attached in a preselected position relative to the primary magnet in order to form a magnetic structure. The secondary magnet has first and second magnetic poles aligned along a second magnetic axis which is rotatable within a second plane. The first and second planes are generally parallel to each other and generally perpendicular to a rotational axis about which the magnetic structure is rotatable.

The angular position sensor made in accordance with the preferred embodiment of the present invention further comprises a first magnetically sensitive component which has a first output signal. The first magnetically sensitive component is responsive to the combined magnetic field of the primary and secondary magnets. The first output signal is representative of the angular position of the magnetic structure relative to the first magnetically sensitive component. The first and second planes are displaced from each other by a preselected distance in order to advantageously affect the rate of change of the first output signal as a function of the angular position of the magnetic structure and, in addition, the first and second magnetic axes are angularily offset from each other to affect the offset magnitude of the first output signal for each angular position of the magnetic structure.

In one embodiment of the present invention, the north magnetic pole of the primary magnet is disposed more proximate to the south magnetic pole of the secondary magnet than to the north magnetic pole of the secondary magnet. In addition, a south magnetic pole of the primary magnet is disposed more proximate to the north magnetic pole of the secondary magnet than it is to the south magnetic pole of the secondary magnet. It should be understood that in alternative embodiments of the present invention, this pole relationship between the primary and secondary magnets can be reversed.

In one embodiment of the present invention, a second magnetically sensitive component is provided which has a second output signal. The second magnetically sensitive component is responsive to the combined magnetic fields of the primary and secondary magnets. The second output signal from the second magnetically sensitive component is also representative of the angular position of the magnetic structure relative to the second magnetically sensitive component. The relationship between the first and second planes and the first and second magnetic axes creates an effect on the second magnetically sensitive component which is similar to the effect that they cause on the first magnetically sensitive component. The first and second magnetically sensitive components can be disposed on opposite sides of the magnetic structure.

The magnetically sensitive components can be Hall effect elements or magnetoresistive elements. Alternatively, they can be ferromagnetic members that are arranged to direct a magnetic field to either a Hall effect element or a magnetoresistive element. For example, the present invention can further comprise a first pole piece and a second pole piece which are disposed in positions to direct the magnetic field of the magnetic structure through the first magnetically sensitive component. Throughout the description of the present invention, it should be understood that the pole pieces are used to direct the magnetic field toward and through magnetically sensitive components, such as Hall effect elements, and the positions of the pole pieces are therefore effectively the positions of the magnetically sensitive components.

BRIEF DESCRIPTION OF THE DRAWINGS

The present invention will be more fully and completely understood from a reading of the Description of the Preferred Embodiment in conjunction with the drawings, in which:

FIG. 3 is a side view of the primary and secondary magnets of the present invention showing the dimension therebetween;

FIG. 5 is a top view of the illustration in FIG. 3;

DESCRIPTION OF THE PREFERRED EMBODIMENT

Figure 1:
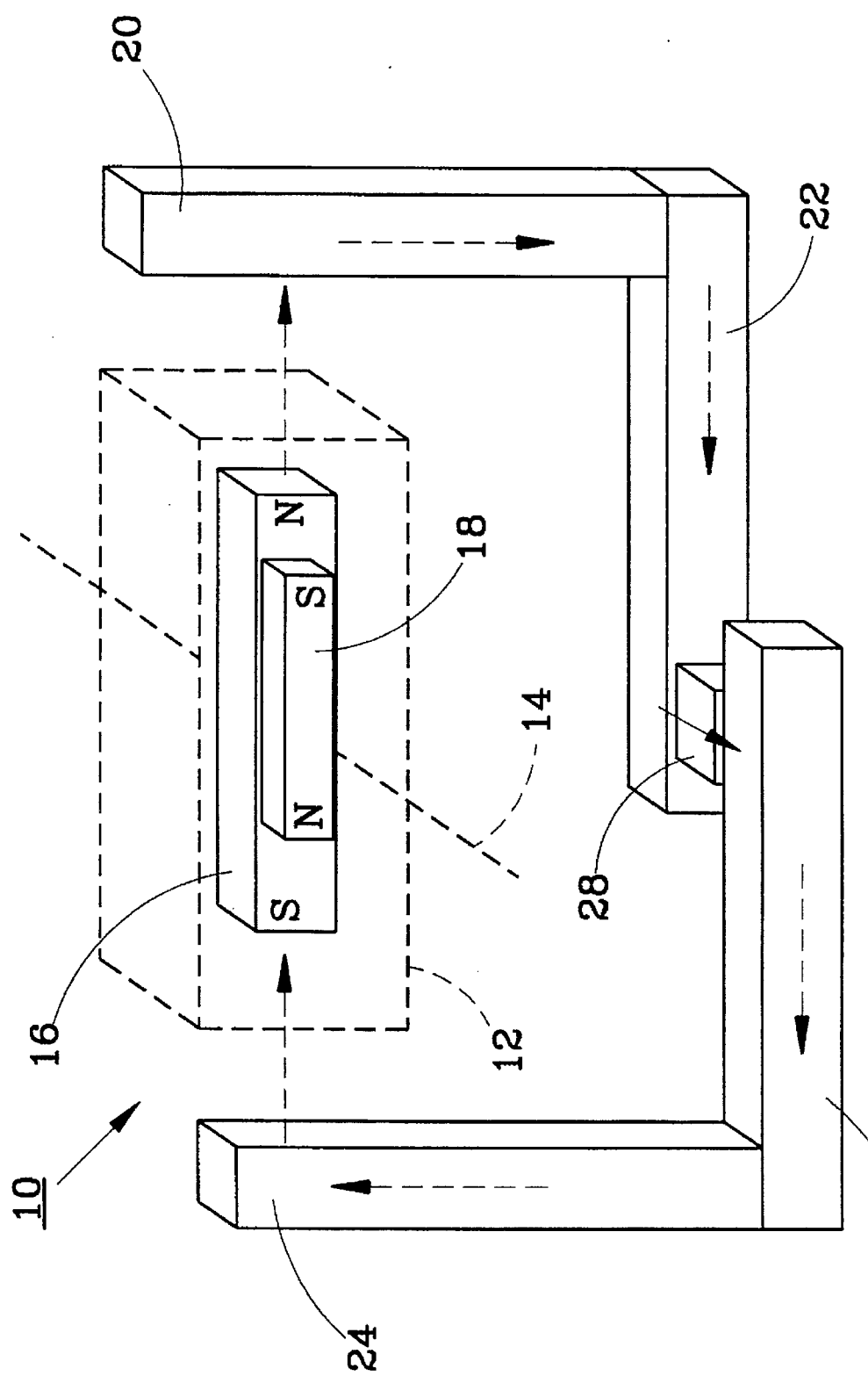
FIG. 1 is a schematic representation of the components of an angular position sensor.

Throughout the Description of the Preferred Embodiment, like components will be identified by like reference numerals.

FIG. 1 shows a schematic representation of an angular position sensor. The angular position sensor shown in FIG. 1 is generally similar to the structure described in U.S. Pat. No. 5,164,668 which is explicitly incorporated by reference herein. The difference between the structure shown in FIG. 1 and the angular position sensor described in U.S. Pat. No. 5,164,668 is the configuration of the magnetic structure used to provide the magnetic field. The angular position sensor 10 shown in FIG. 1 comprises a magnetic structure 12 that is rotatable about an axis of rotation 14. The magnetic structure 12 comprises a primary magnet 16 and a secondary magnet 18 arranged in parallel magnetic association with each other. The magnetic structure 12 has a first polar end at one end thereof and, at the opposite end of the structure 12, a second polar end. The primary and secondary magnets are rigidly held in place relative to each other.

In FIG. 1, a first pole piece structure is shown comprising ferromagnetic members 20 and 22. A second pole piece structure is shown comprising ferromagnetic members 24 and 26. Between the ferromagnetic members 22 and 26, a magnetically sensitive component 28 is disposed in the region where the two ferromagnetic members overlap. This creates a magnetic flux path through the magnetically sensitive component 28. When assembled in the manner shown in FIG. 1, the magnetic field provided by the magnetic structure 12 is directed generally in the path represented by the dashed line arrows. Using the conventional direction, in which a magnetic field is assumed to pass from the north pole of a magnetic structure, the magnetic field is directed along the low reluctance path through the ferromagnetic members 20 and 22, through the magnetically sensitive component 28, and then through the ferromagnetic members 26 and 24 where it returns to the south pole of the magnetic structure 12 to complete the magnetic field circuit.

Unlike the prior art angular position sensor described in U.S. Pat. No. 5,164,668, the magnetic structure 12 of the present invention shown in FIG. 1 comprises two magnets in order to permit the angular position sensor to be adjusted and calibrated mechanically. It should be understood that when an angular position sensor such as that shown in FIG. 1 is initially assembled, the signals provided by the magnetically sensitive component 28 may not precisely represent the rotational position of the magnetic structure 12 in the manner in which they are intended. For example, if a vertical magnet position in FIG. 1 is intended to represent a rotation of zero degrees, the output from the magnetically sensitive component 28 may not precisely provide the desired output voltage when the magnetic structure 12 is in a vertical position perpendicular to that shown in FIG. 1. In known sensors of this type, resistors within the electronic circuitry which are connected in association with the magnetically sensitive component 28 can be trimmed and adjusted to create this desired output voltage when the magnetic structure 12 is in a presumed zero degree reference position. In addition, the rate of change of the output signal from the magnetically sensitive component 28 for each degree of rotation of the magnetic structure 12 may not initially be as desired. In other words, as the magnetic structure 12 rotates about the axis of rotation 14, each degree of rotation is normally expected to change the magnitude of the output signal from the magnetically sensitive component 28. If the strength of the magnetic structure 12 is different than that which is expected, this rate of change might either be too high or too low. Again, the circuitry associated with the magnetically sensitive component 28 can be electronically trimmed to adjust to achieve the proper gain. The present invention is intended to permit these two adjustments to be made mechanically without the need for electronically changing the circuit associated with the magnetically sensitive component.

Figure 2:
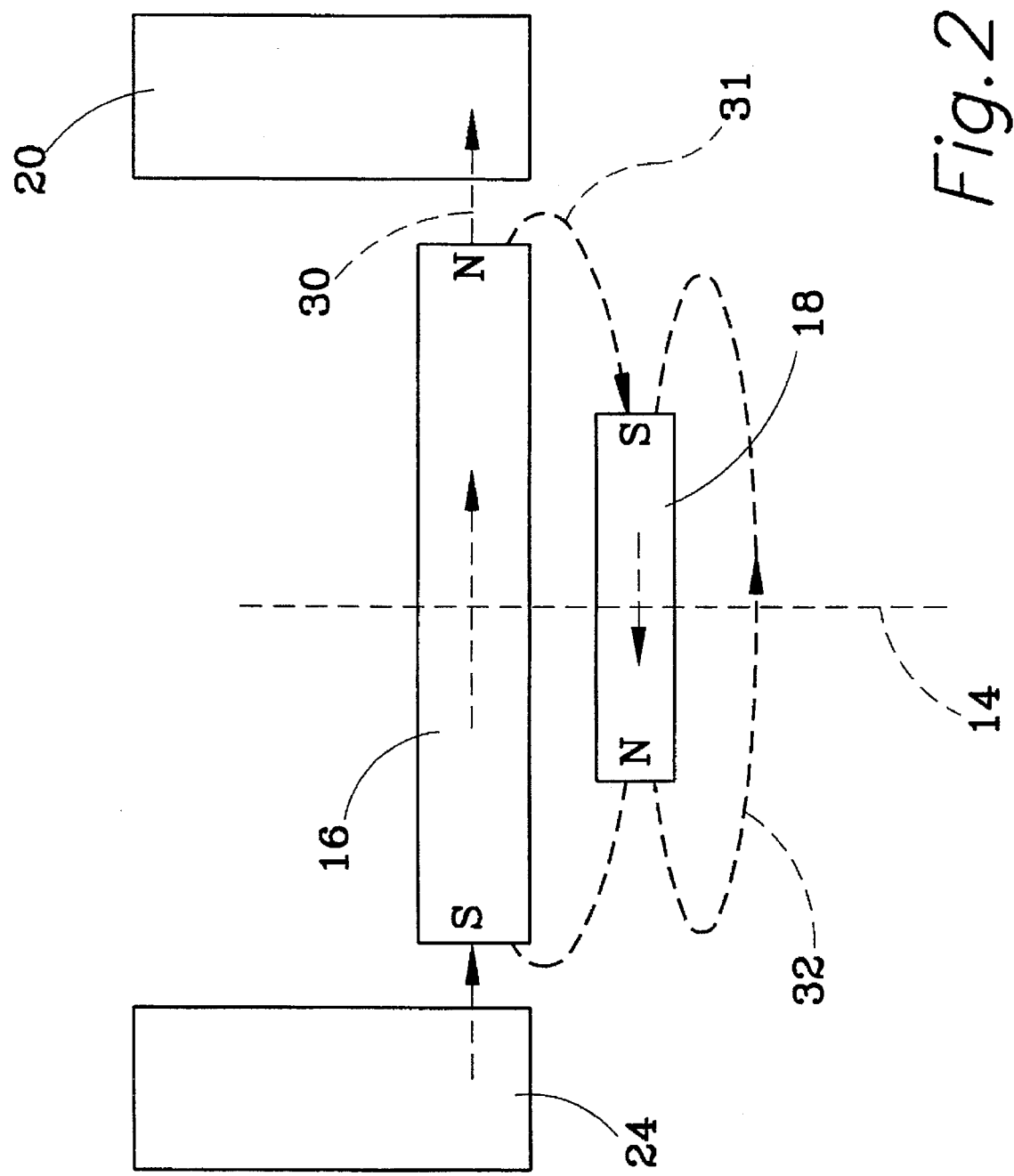
FIG. 2 is a simplified schematic showing the primary and secondary magnets of the present invention combined with two ferromagnetic pole pieces.

FIG. 2 is a schematic representation of the primary magnet 16, the secondary magnet 18 and the first and fourth ferromagnetic members, 20 and 24. The magnetic fields of the primary and secondary magnets are represented by the dashed lines and the conventional direction of the magnetic fields is indicated by the arrowheads. The magnetic field 30 of the primary magnet 16 extends from its north pole and passes into the ferromagnetic object 20. As described above in conjunction with FIG. 1, the magnetic field 30 of the primary magnet 16 extends from its north pole into the ferromagnetic object 20. In a typical application of the present invention, a structure of ferromagnetic material would provide a magnetic path that returns the magnetic field through the ferromagnetic object 24 to the south pole of the primary magnet 16 as shown in FIG. 2. Part of the magnetic field of the primary magnet 16 is shunted through the secondary magnet 18 whose magnetic field is identified by reference numeral 32. The portion of the magnetic field 30 which is shunted through the secondary magnet 18 is identified by reference numeral 31. The shunting of the magnetic field by the secondary magnet 18 affects the strength of the effective magnetic field extending through the ferromagnetic members. The primary and secondary magnets, 16 and 18, can be adjusted with respect to each other in two significant ways. First, the secondary magnet 18 can be moved away from the primary magnet in a direction along the axis of rotation 14. In addition, the secondary magnet 18 can be moved relative to the primary magnet 16 in an angular manner by rotating the two magnets relative to each other about the central axis of rotation 14. As illustrated in FIG. 2, the secondary magnet 18 can be disposed at a location which is not between the two ferromagnetic objects, 20 and 24.

Figure 4:
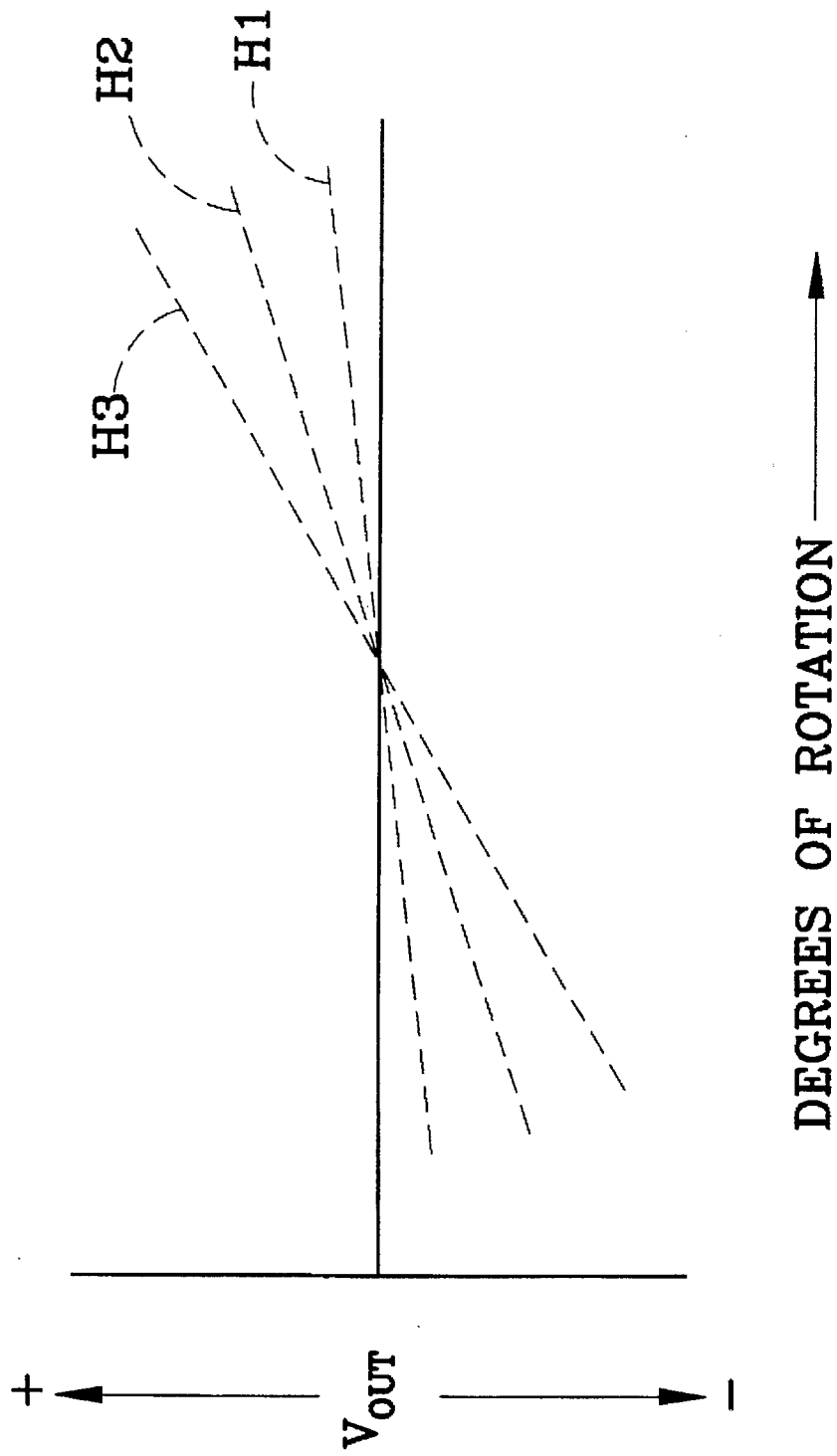
FIG. 4 is a graphical representation illustrating how the gain of the output signal from an angular position sensor can be modified by using the present invention.

FIG. 3 shows the primary magnet 16 and the secondary magnet 18 with a space H between them. In FIG. 3, the primary magnet 16 is shown with a magnetic axis 17 that extends through the first and second magnetic poles of the primary magnet 16. Similarly, the secondary magnet 18 is shown with its second magnetic axis 19 extending through its first and second magnetic poles. In a magnetic sensor similar to that shown in FIG. 1, a change in the magnitude of dimension H will cause a change in the gain of the output signal from a magnetically sensitive component 28 as a function of the angular position of the magnetic structure 12. For example, with reference to FIGS. 3 and 4, the dashed lines, H1, H2 and H3, represent three different gains that could be achieved by changing dimension H. For example, if dimension H in FIG. 3 is reduced to the least of three alternative magnitudes, the relationship represented by dashed line H1 could be achieved. If dimension H is increased to the middle of the three alternatives, the relationship represented by dashed line H2 in FIG. 4 could be achieved. Similarly, a further increase in dimension H could achieve the dashed line relationship identified as H3 in FIG. 4. It should be understood that an increase in the magnitude of dimension H in FIG. 3 will achieve an increased rate of change of the output signal in response to a change in the degrees of rotation of the magnet structure 12 relative to a magnetically sensitive component.

FIG. 5 shows a top view of the primary 16 and secondary 18 magnets shown in FIG. 3. The second magnetic axis 19, which extends through the first and second magnetic pole of the secondary magnet 18, is rotated relative to the first magnetic axis 17 which extends through the first and second magnetic poles of the primary magnet 16. The angle of this relative rotation is represented as angle $\Theta$ in FIG. 5. It should be understood that, as the secondary magnet 18 is rotated relative to the primary magnet 16, a resultant magnetic vector is shifted away from the first magnetic axis 17 in the direction away from the position of the second magnetic axis 19. The precise direction of the magnetic vector is a function of angle $\Theta$ and the relative magnetic strengths of the primary and secondary magnets.

Figure 6:
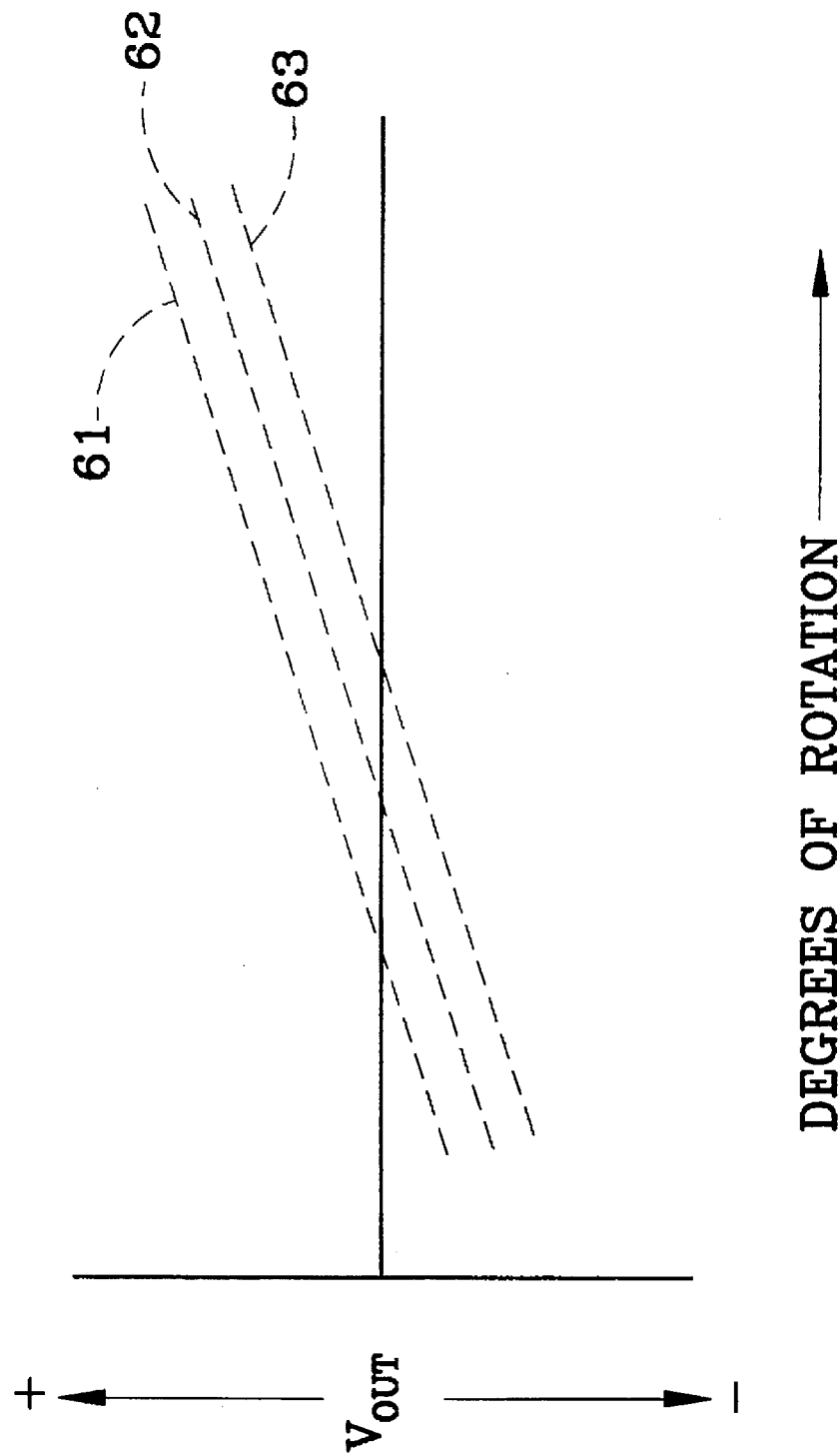
FIG. 6 is a graphical representation showing how the offset of an output signal can be adjusted by using the present invention.

FIG. 6 shows three dashed lines representing the output voltage from a magnetically sensitive component as a function of the degrees of rotation of the magnetic structure. The three dashed lines, 61, 62 and 63, can be achieved by changing the magnitude of the angle between the primary and secondary magnetic axes in FIG. 5. The changes illustrated in FIG. 6 are referred to as the offset characteristic of the voltage output signal provided by the magnetically sensitive component. In other words, for any particular angle of the magnetic structure 12, the output signal can be offset from a reference magnitude by changing the angle between the first and second magnetic axes, 17 and 19, of the primary and secondary magnets. Because of the vector addition relationship of the magnetic fields, a slight magnitude change may also occur as a result of the change of the angular relationship between the magnets.

With reference to FIGS. 3, 4, 5 and 6, it can be seen that the output from a magnetically sensitive component can be adjusted and calibrated mechanically by changing the relative positions of the primary and secondary magnets within the magnetic structure. The gain of the output signal can be adjusted by changing dimension H as described above in conjunction with FIGS. 3 and 4 and the offset of the output signal can be adjusted by changing the angular relationship between the first and second magnetic axes, 17 and 19, in the manner described above in conjunction with FIGS. 5 and 6. Taken together, these two types of adjustments can permit the output signal from the magnetically sensitive component to be adjusted to any reasonable relationship by selectively altering the gain and offset characteristics of the structure. These adjustments are mechanical in nature and do not require electronic calibration. When the proper positions of the primary and secondary magnets are achieved, these two magnets can be locked in position relative to each other and permanently sealed. The two magnets can be locked to each other by mechanical means such as screws, overmolding or, alternatively, can be locked in position relative to each other through the use of potting materials such as epoxy. Other locking methods are also possible.

Figure 7:
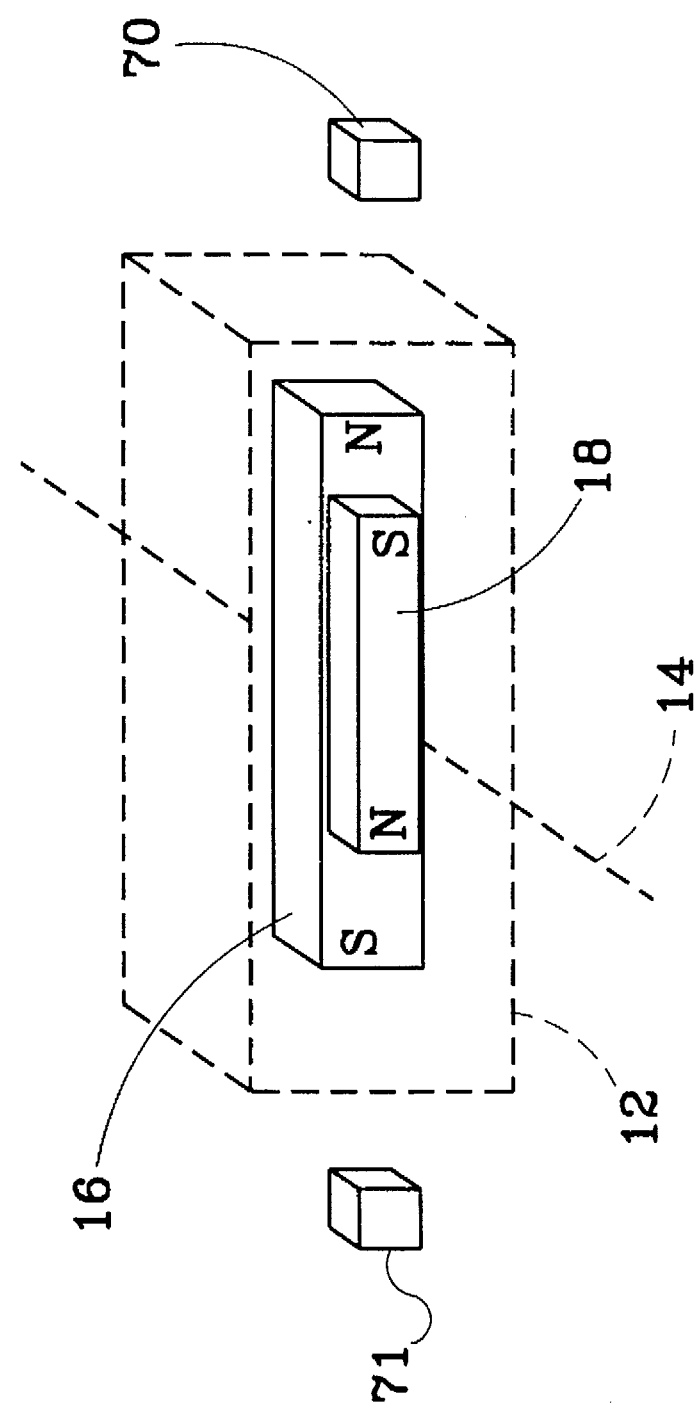
FIG. 7 illustrates an alternative configuration of the present invention.

FIG. 7 illustrates an alternative configuration to that shown in FIG. 1. The magnetic structure 12 can be rotated about its axis of rotation 14 and spaced apart from a magnetically sensitive component 70 that does not employ pole pieces in the manner described above in conjunction with FIG. 1. In addition, it should be understood that a second magnetically sensitive component could be disposed on the opposite side of the magnetic structure 12 and the signals from the first and second magnetically sensitive components could be compared to determine the angular position of the magnetic structure. Throughout the Description of the Present Invention, several alternative configurations have been discussed. In conjunction with FIG. 1, pole pieces are placed on opposite sides of the magnetic structure 12 for the purpose of directing the magnetic field to a preselected location where a magnetically sensitive component 28 is disposed. It should be clearly understood that first and second magnetically sensitive components could be disposed in place of the first and fourth ferromagnetic members, 20 and 24, in FIG. 1. The use of pole pieces to direct the magnetic field is merely a convenience and is sometimes used to permit the magnetically sensitive component 28 to be placed at a particularly advantageous location where it can be electrically connected to a circuit. It should therefore be understood that the use of pole pieces, such as the ferromagnetic members 20 and 24, could alternatively be replaced by the use of actual magnetically sensitive components, 70 and 71, disposed at those locations. In addition, it should also be understood that a single magnetically sensitive component, such as that identified by reference numeral 70 in FIG. 7, could be used for these purposes. The number of magnetically sensitive components and the configuration of ferromagnetic pole pieces is generally determined by the restrictions placed on the shape and size of the angular position sensor. In addition, the selection of these design characteristics is also a function of the required linearity and accuracy of the rotational position sensor.

The present invention has been illustrated in FIG. 1 to show the north pole of the primary magnet 16 disposed more proximate to the south pole of the secondary magnet 18 than to the north pole of the secondary magnet 18. However, it should be understood that an alternative embodiment of the present invention could reverse the polarity of the two poles of the secondary magnet 18 and could function equally as well. The function of the secondary magnet 18 is to shunt a portion of the magnetic field of the primary magnetic 16. It can function equally well by adding its magnetic field strength to that of the primary magnet.

The embodiments of the invention in which an exclusive property or right is claimed are defined as follows:

1. An angular position sensor, comprising:
   a primary magnet having first and second magnetic poles aligned along a first magnetic axis, said first magnetic axis being rotatable within a first plane;
   a secondary magnet being rigidly attached in a permanent position relative to said primary magnet to form a magnetic structure having a generally constant effective combined magnetic field emanating therefrom, said secondary magnet having first and second magnetic poles aligned along a second magnetic axis, said second magnetic axis being rotatable within a second plane, said first and second planes being generally parallel to each other, said magnetic structure being rotatable about a rotational axis; and
   a first magnetically sensitive component having a first output signal, said first magnetically sensitive component being responsive to the combined magnetic field of said primary and secondary magnets, said first output signal being representative of the angular position of said magnetic structure relative to said first magnetically sensitive component, said first and second planes being displaced from each other by a preselected distance to affect rate of change of said first output signal as a function of said angular position of said magnetic structure, said first and second magnetic axes being angularly offset from each other to affect the offset magnitude of said first output signal for each angular position of said magnetic structure, said primary and secondary magnets being arranged in parallel magnetic association with each other to provide said combined magnetic field, said combined magnetic field passing from a first polar end of the parallel magnetic association through the first magnetically sensitive component and returning to a second polar end of the parallel magnetic association.

2. The sensor of claim 1, wherein:
   a north magnetic pole of said primary magnet is disposed more proximate to a north magnetic pole of said secondary magnet than to a south magnetic pole of said secondary magnet and a south magnetic pole of said primary magnet is disposed more proximate to a south magnetic pole of said secondary magnet than to a north magnetic pole of said secondary magnet.

3. The sensor of claim 1, wherein:
   a south magnetic pole of said primary magnet is disposed more proximate to a north magnetic pole of said secondary magnet than to a south magnetic pole of said secondary magnet and a north magnetic pole of said primary magnet is disposed more proximate to a south magnetic pole of said secondary magnet than to a north magnetic pole of said secondary magnet.

4. The sensor of claim 1, further comprising:
   a second magnetically sensitive component having a second output signal, said second magnetically sensitive component being responsive to the combined magnetic field of said primary and secondary magnets, said second output signal being representative of the angular position of said magnetic structure relative to said second magnetically sensitive component, said first and second planes being displaced from each other by a preselected distance to affect rate of change of said second output signal as a function of said angular position of said magnetic structure, said first and second magnetic axes being angularly offset from each other to affect the offset magnitude of said second output signal for each angular position of said magnetic structure.

5. The sensor of claim 4, wherein:
   said first and second magnetically sensitive components are disposed on opposite sides of said magnetic structure.

6. The sensor of claim 1, further comprising:
   a first pole piece and a second pole piece disposed to direct the magnetic field of said magnetic structure through said first magnetically sensitive component.

7. The sensor of claim 1, wherein:
   said magnetically sensitive component comprises a Hall effect element.

8. An angular position sensor, comprising:
   a primary magnet having first and second magnetic poles aligned along a first magnetic axis, said first magnetic axis being rotatable within a first plane;
   a secondary magnet being rigidly attached in a permanent position relative to said primary magnet to form a magnetic structure having a generally constant effective combined magnetic field emanating therefrom, said secondary magnet having first and second magnetic poles aligned along a second magnetic axis, said second magnetic axis being rotatable within a second plane, said first and second planes being generally parallel to each other, said magnetic structure being rotatable about a rotational axis; and
   a first magnetically sensitive component having a first output signal, said first magnetically sensitive component being responsive to the combined magnetic field of said primary and secondary magnets, said first output signal being representative of the angular position of said magnetic structure relative to said first magnetically sensitive component, said first and second planes being displaced from each other by a preselected distance to affect rate of change of said first output signal as a function of said angular position of said magnetic structure, said first and second magnetic axes being angularly offset from each other to affect the offset magnitude of said first output signal for each angular position of said magnetic structure, said primary and secondary magnets being arranged in parallel magnetic association with each other to provide said combined magnetic field, said combined magnetic field passing from a first polar end of the parallel magnetic association through the first magnetically sensitive component and returning to a second polar end of the parallel magnetic association, said magnetically sensitive component comprising a Hall effect element.

9. The sensor of claim 8, wherein:
   a north magnetic pole of said primary magnet is disposed more proximate to a north magnetic pole of said secondary magnet than to a south magnetic pole of said secondary magnet and a south magnetic pole of said primary magnet is disposed more proximate to a south magnetic pole of said secondary magnet than to a north magnetic pole of said secondary magnet.

10. The sensor of claim 8, wherein:

a south magnetic pole of said primary magnet is disposed more proximate to a north magnetic pole of said secondary magnet than to a south magnetic pole of said secondary magnet and a north magnetic pole of said primary magnet is disposed more proximate to a south magnetic pole of said secondary magnet than to a north magnetic pole of said secondary magnet.

11. The sensor of claim 8, further comprising:

a second magnetically sensitive component having a second output signal, said second magnetically sensitive component being responsive to the combined magnetic field of said primary and secondary magnets, said second output signal being representative of the angular position of said magnetic structure relative to said second magnetically sensitive component, said first and second planes being displaced from each other by a preselected distance to affect rate of change of said second output signal as a function of said angular position of said magnetic structure, said first and second magnetic axes being angularly offset from each other to affect the offset magnitude of said second output signal for each angular position of said magnetic structure.

12. The sensor of claim 11, wherein:

said first and second magnetically sensitive components are disposed on opposite sides of said magnetic structure.

13. The sensor of claim 8, further comprising:

a first pole piece and a second pole piece disposed to direct the magnetic field of said magnetic structure through said first magnetically sensitive component.

14. An angular position sensor, comprising:

a primary magnet having first and second magnetic poles aligned along a first magnetic axis, said first magnetic axis being rotatable within a first plane;

a secondary magnet being rigidly attached in a permanent position relative to said primary magnet to form a magnetic structure having a generally constant effective combined magnetic field emanating therefrom, said secondary magnet having first and second magnetic poles aligned along a second magnetic axis, said second magnetic axis being rotatable within a second plane, said first and second planes being generally parallel to each other, said magnetic structure being rotatable about a rotational axis;

a first magnetically sensitive component having a first output signal, said first magnetically sensitive component being responsive to the combined magnetic field of said primary and secondary magnets, said first output signal being representative of the angular position of said magnetic structure relative to said first magnetically sensitive component, said first and second planes being displaced from each other by a preselected distance to affect rate of change of said first output signal as a function of said angular position of said magnetic structure, said first and second magnetic axes being angularly offset from each other to affect the offset magnitude of said first output signal for each angular position of said magnetic structure, said primary and secondary magnets being arranged in parallel magnetic association with each other to provide said combined magnetic field, said combined magnetic field passing from a first polar end of the parallel magnetic association through the first magnetically sensitive component and returning to a second polar end of the parallel magnetic association, said magnetically sensitive component comprising a Hall effect element; and a first pole piece and a second pole piece disposed to direct the magnetic field of said magnetic structure through said first magnetically sensitive component.

15. The sensor of claim 14, wherein:

a north magnetic pole of said primary magnet is disposed more proximate to a north magnetic pole of said secondary magnet than to a south magnetic pole of said secondary magnet and a south magnetic pole of said primary magnet is disposed more proximate to a south magnetic pole of said secondary magnet than to a north magnetic pole of said secondary magnet.

16. The sensor of claim 14, wherein:

a south magnetic pole of said primary magnet is disposed more proximate to a north magnetic pole of said secondary magnet than to a south magnetic pole of said secondary magnet and a north magnetic pole of said primary magnet is disposed more proximate to a south magnetic pole of said secondary magnet than to a north magnetic pole of said secondary magnet.

17. The sensor of claim 14, further comprising:

a second magnetically sensitive component having a second output signal, said second magnetically sensitive component being responsive to the combined magnetic field of said primary and secondary magnets, said second output signal being representative of the angular position of said magnetic structure relative to said second magnetically sensitive component, said first and second planes being displaced from each other by a preselected distance to affect rate of change of said second output signal as a function of said angular position of said magnetic structure, said first and second magnetic axes being angularly offset from each other to affect the offset magnitude of said second output signal for each angular position of said magnetic structure.

18. The sensor of claim 17, wherein:

said first and second magnetically sensitive components are disposed on opposite sides of said magnetic structure.

* * * * *